United States Patent
Peng et al.

(10) Patent No.: US 11,972,557 B2
(45) Date of Patent: Apr. 30, 2024

(54) VIBRATION OBJECT MONITORING METHOD AND APPARATUS, COMPUTER DEVICE AND STORAGE MEDIUM

(71) Applicant: CSG POWER GENERATION CO., LTD., Guangzhou (CN)

(72) Inventors: Yumin Peng, Guangzhou (CN); Zhiqiang Wang, Guangzhou (CN); Hao Zhang, Guangzhou (CN); Hengjun Chen, Guangzhou (CN); Xun Hu, Guangzhou (CN); Tuixiang Feng, Guangzhou (CN); Liqun Sun, Guangzhou (CN); Man Chen, Guangzhou (CN); Yong Lu, Guangzhou (CN); Tao Liu, Guangzhou (CN); Kai Lin, Guangzhou (CN); Yulin Han, Guangzhou (CN)

(73) Assignee: CSG POWER GENERATION CO., LTD., Guangzhou (CN)

( * ) Notice: Subject to any disclaimer, the term of this patent is extended or adjusted under 35 U.S.C. 154(b) by 0 days.

(21) Appl. No.: 18/550,727

(22) PCT Filed: Mar. 8, 2021

(86) PCT No.: PCT/CN2021/079472
§ 371 (c)(1),
(2) Date: Sep. 15, 2023

(87) PCT Pub. No.: WO2022/121132
PCT Pub. Date: Jun. 16, 2022

(65) Prior Publication Data
US 2024/0054635 A1    Feb. 15, 2024

(30) Foreign Application Priority Data
Dec. 12, 2020 (CN) .................. 202011452604.1

(51) Int. Cl.
*G06T 7/00* (2017.01)
*G06T 7/12* (2017.01)
(Continued)

(52) U.S. Cl.
CPC ................ *G06T 7/001* (2013.01); *G06T 7/12* (2017.01); *G06T 7/248* (2017.01); *G06T 7/90* (2017.01);
(Continued)

(58) Field of Classification Search
CPC .... G06T 7/001; G06T 7/12; G06T 7/248; G06T 7/90; G06T 2207/10016;
(Continued)

(56) References Cited

U.S. PATENT DOCUMENTS

| 10,810,858 B2* | 10/2020 | Israelsen | G01M 3/22 |
| 2006/0285850 A1* | 12/2006 | Colpitts | G01D 5/35364 |
| | | | 374/E11.015 |

(Continued)

FOREIGN PATENT DOCUMENTS

| CN | 110245650 A | 9/2019 |
| CN | 110595745 A | 12/2019 |

(Continued)

OTHER PUBLICATIONS

Translated International Search Report with original Written Opinion, App. No. PCT/CN2021/079472, mail date Sep. 10, 2021, pp. 1-13.
(Continued)

*Primary Examiner* — Ali Bayat
(74) *Attorney, Agent, or Firm* — George R. McGuire

(57) ABSTRACT

Provided are a vibration object monitoring method and apparatus, a computer device, and a storage medium. The method includes: in response to detecting that a vibration object exists in a monitoring video picture for a target
(Continued)

monitoring region, a vibration object region in the monitoring video picture is determined, where the vibration object region is a region where the vibration object is located in the monitoring video picture; displacement information of a key point of the vibration object in the vibration object region is recorded; vibration information of the vibration object in the monitoring video picture is determined based on the displacement information; and a vibration object monitoring result for the target monitoring region is generated according to the vibration information. The abnormal vibration monitoring can be performed on the vibration object in the target monitoring region in time according to this method.

18 Claims, 7 Drawing Sheets

(51) Int. Cl.
| | |
|---|---|
| *G06T 7/246* | (2017.01) |
| *G06T 7/90* | (2017.01) |
| *G06V 10/44* | (2022.01) |
| *G06V 20/40* | (2022.01) |
| *G06V 20/52* | (2022.01) |
| *G08B 6/00* | (2006.01) |

(52) U.S. Cl.
CPC ........... *G06V 10/443* (2022.01); *G06V 20/46* (2022.01); *G06V 20/49* (2022.01); *G06V 20/52* (2022.01); *G08B 6/00* (2013.01); *G06T 2207/10016* (2013.01); *G06T 2207/10024* (2013.01); *G06T 2207/20021* (2013.01); *G06T 2207/30108* (2013.01)

(58) Field of Classification Search
CPC . G06T 2207/10024; G06T 2207/20021; G06T 2207/30108; G06V 10/443; G06V 20/46; G06V 20/49; G06V 20/52; G08B 6/00
USPC .......................................................... 382/103
See application file for complete search history.

(56) References Cited

U.S. PATENT DOCUMENTS

| | | | |
|---|---|---|---|
| 2012/0093361 A1* | 4/2012 | Huang | G06T 7/277 382/103 |
| 2017/0032194 A1 | 2/2017 | Yu et al. | |
| 2019/0235083 A1* | 8/2019 | Zhang | G01S 7/51 |
| 2019/0250060 A1* | 8/2019 | Kawai | G01S 19/47 |
| 2019/0340914 A1* | 11/2019 | Israelsen | G01M 3/04 |
| 2020/0041406 A1* | 2/2020 | Asano | G06V 10/761 |
| 2020/0198538 A1 | 6/2020 | Kwon | |

FOREIGN PATENT DOCUMENTS

| | | |
|---|---|---|
| CN | 110595749 A | 12/2019 |
| CN | 110617973 A | 12/2019 |
| CN | 110650316 A | 1/2020 |
| CN | 111010544 A | 4/2020 |
| CN | 111914661 A | 11/2020 |

OTHER PUBLICATIONS

Translation of OA1 of CN prior application, App. No. 202011452604.1, dated Dec. 5, 2022, pp. 1-10.
Translation of OA2 of CN prior application, App. No. 202011452604.1, dated Apr. 11, 2023, pp. 1-10.

* cited by examiner

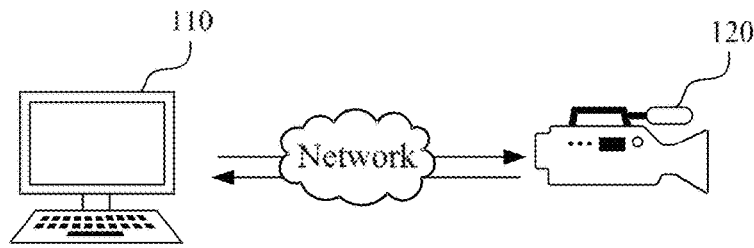

FIG. 1

```
┌─────────────────────────────────────────────────────────────┐
│ If it is detected that a vibration object exists in a       │
│ surveillance video picture for a target surveillance        │──S210
│ region, determine a vibration object region in the          │
│ surveillance video picture, where the vibration object      │
│ region is a region where the vibration object is located    │
│ in the surveillance video picture                           │
└─────────────────────────────────────────────────────────────┘
                              ↓
┌─────────────────────────────────────────────────────────────┐
│ Record displacement information of a key point of the       │──S220
│ vibration object in the vibration object region             │
└─────────────────────────────────────────────────────────────┘
                              ↓
┌─────────────────────────────────────────────────────────────┐
│ Determine vibration information of the vibration object     │──S230
│ in the surveillance video picture based on the              │
│ displacement information                                    │
└─────────────────────────────────────────────────────────────┘
                              ↓
┌─────────────────────────────────────────────────────────────┐
│ Generate a vibration object monitoring result for the       │──S240
│ target surveillance region according to the vibration       │
│ information                                                 │
└─────────────────────────────────────────────────────────────┘
```

FIG. 2

VIBRATION OBJECT MONITORING METHOD AND APPARATUS, COMPUTER DEVICE AND STORAGE MEDIUM

CROSS-REFERENCE TO RELATED APPLICATIONS

This is a national stage application filed under 35 U.S.C. 371 based on International Patent Application No. PCT/CN2021/079472, filed on Mar. 8, 2021, which claims priority to Chinese Patent Application No. 202011452604.1 filed with the China National Intellectual Property Administration (CNIPA) on Dec. 12, 2020, the disclosures of which are incorporated herein by reference in their entireties.

TECHNICAL FIELD

The present application relates to the field of computer technologies, and in particular to, a vibration object monitoring method and apparatus, a computer device and a storage medium.

BACKGROUND

In the flowing process of a working medium in an industrial pipeline, due to abnormal conditions such as opening and closing of a valve or leakage of the working media, the working media often causes the vibration of the pipeline under the inertia effect. Under normal conditions, the pipeline is allowed to vibrate at certain amplitudes and frequencies. If the vibration is out of normal ranges and is not handled in time, then the pipeline is easily damaged or the leakage of the working media occurs at positions of the attachment flange and the valve.

In the related art, it is often necessary for the worker to manually monitor the vibration generated by the industrial pipeline. However, the occurrence of the vibration of the pipeline and its precursor phenomenon tends to be random, and the manual monitoring cannot achieve the full-range and full-period surveilling, which makes it impossible to timely monitor the abnormal vibration of the industrial pipeline in the related art.

SUMMARY

Based on this, for the above-described technical problems, it is necessary to provide a vibration object monitoring method and apparatus, a computer device and a storage medium which can perform the vibration monitoring on a vibration object of a target monitoring region in time.

A vibration object monitoring method is provided. The method includes that: in response to detecting that a vibration object exists in a monitoring video picture for a target monitoring region, a vibration object region in the monitoring video picture is determined, where the vibration object region is a region where the vibration object is located in the monitoring video picture, and where the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture; displacement information of a key point of the vibration object in the vibration object region is recorded, where that the displacement information of the key point of the vibration object in the vibration object region is recorded includes that: a distance between the key point of the vibration object and an original point in the vibration object region is respectively calculated in each image frame of the monitoring video picture, and the distance is used as a key point distance; and the key point distance corresponding to each image frame is used as the displacement information; vibration information of the vibration object in the monitoring video picture is determined based on the displacement information; and a vibration object monitoring result for the target monitoring region is generated according to the vibration information; where in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\sum_i^N x_i}{N}, \frac{\sum_i^N y_i}{N} \right),$$

where $(x_i, y_i)$ denotes coordinates in the set of edge points $L_t$, and N denotes a total number of the edge points in the set of edge points $L_t$; a distance from the center point $C_t$ to the original point, i.e., a center point distance $D_t$ is determined, where a calculation formula of the center point distance $D_t$ is as follows: $D_t\sqrt{x_c^2+y_c^2}$; a normalization process is performed on the center point distance $D_t$ of each image frame, wherein a formula of the normalization process is as follows: $D_t=D_t-\text{mean}(D_t)$, where t denotes a t-th image frame, $D_t$ denotes a center point distance of the t-th image frame, and mean($D_t$) denotes a mean of center point distances of all image frames; and $D=\{D_1, D_2, \ldots, D_n\}$ obtained through the preceding processing is used as the displacement information.

In one embodiment, the method further includes that: an image content change degree in the monitoring video picture is acquired; and in response to determining that the image content change degree is in a preset change range, it is determined that the vibration object exists in the monitoring video picture.

In one embodiment, that the vibration object region in the monitoring video picture is determined includes that: the monitoring video picture is divided into multiple candidate regions; an image content change degree corresponding to each of the multiple candidate regions in the monitoring video picture is acquired; and a candidate region with a highest image content change degree is used as the vibration object region.

In one embodiment, the vibration information of the vibration object in the monitoring video picture is determined based on the displacement information includes that: a vibration periodic signal for the vibration object is plotted according to the key point distance corresponding to each image frame; and a vibration amplitude of the vibration object and a vibration frequency of the vibration object are determined according to the vibration periodic signal.

In one embodiment, the vibration information includes a vibration amplitude of the vibration object and a vibration frequency of the vibration object, and that the vibration object monitoring result for the target monitoring region is generated according to the vibration information includes that: in response to determining that the vibration amplitude is greater than a preset amplitude threshold, and/or the vibration frequency is greater than a preset frequency threshold, vibration abnormality alarm information for the vibration object is generated, and the vibration abnormality alarm information is used as the vibration object monitoring result.

In one embodiment, when the vibration object is a pipeline, that the vibration abnormality alarm information for the vibration object is generated includes that: pipeline color information of the pipeline in the monitoring video picture is identified, and region type information of the target monitoring region is acquired; pipeline type information and pipeline working medium information corresponding to the pipeline are inquired according to the pipeline color information and the region type information; and alarm information including the pipeline type information, the pipeline working medium information and the vibration information is generated, and the alarm information is used as the vibration abnormality alarm information.

A vibration object monitoring apparatus is provided. The vibration object monitoring apparatus includes a detection module, a recording module, a determination module and a generation module. The detection module is configured to determine a vibration object region in a monitoring video picture in response to detecting that a vibration object exists in the monitoring video picture for a target monitoring region, where the vibration object region is a region where the vibration object is located in the monitoring video picture, and where the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture. The recording module is configured to record displacement information of a key point of the vibration object in the vibration object region, where the recording module is configured to: respectively calculate, in each image frame of the monitoring video picture, a distance between the key point of the vibration object and an original point in the vibration object region, and use the distance as a key point distance; and use the key point distance corresponding to each image frame as the displacement information. The determination module is configured to determine vibration information of the vibration object in the monitoring video picture based on the displacement information. The generation module is configured to generate a vibration object monitoring result for the target monitoring region according to the vibration information. In a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left(\frac{\sum_i^N x_i}{N}, \frac{\sum_i^N y_i}{N}\right),$$

where $(x_i, y_i)$ denotes coordinates in the set of edge points $L_t$, and N denotes a total number of the edge points in the set of edge points $L_t$; a distance from the center point $C_t$ to the original point, i.e., a center point distance $D_t$ is determined, wherein a calculation formula of the center point distance $D_t$ is as follows: $D_t = \sqrt{x_c^2 + y_c^2}$; a normalization process is performed on the center point distance $D_t$ of each image frame, wherein a formula of the normalization process is as follows: $D_t = D_t - \text{mean}(D_t)$, where t denotes a t-th image frame, $D_t$ denotes a center point distance of the t-th image frame, and $\text{mean}(D_t)$ denotes a mean of center point distances of all image frames; and $D = \{D_1, D_2, \ldots, D_n\}$ obtained through the preceding processing is used as the displacement information.

A computer device is provided. The computer device includes a memory and a processor. The memory stores a computer program, and the computer program, when executed by the processor, implements following steps: in response to detecting that a vibration object exists in a monitoring video picture for a target monitoring region, a vibration object region in the monitoring video picture is determined, where the vibration object region is a region where the vibration object is located in the monitoring video picture, and where the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture; displacement information of a key point of the vibration object in the vibration object region is recorded, where that the displacement information of the key point of the vibration object in the vibration object region is recorded includes that: a distance between the key point of the vibration object and an original point in the vibration object region is respectively calculated in each image frame of the monitoring video picture, and the distance is used as a key point distance; and the key point distance corresponding to each image frame is used as the displacement information; vibration information of the vibration object in the monitoring video picture is determined based on the displacement information; and a vibration object monitoring result for the target monitoring region is generated according to the vibration information; where in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\Sigma_i^N x_i}{N}, \frac{\Sigma_i^N y_i}{N} \right),$$

where $(x_i, y_i)$ denotes coordinates in the set of edge points $L_t$, and N denotes a total number of the edge points in the set of edge points $L_t$; a distance from the center point $C_t$ to the original point, i.e., a center point distance $D_t$, is determined, wherein a calculation formula of the center point distance $D_t$ is as follows: $D_t = \sqrt{x_c^2 + y_c^2}$; a normalization process is performed on the center point distance $D_t$ of each image frame, wherein a formula of the normalization process is as follows: $D_t = D_t - \text{mean}(D_t)$, where t denotes a t-th image frame, $D_t$ denotes a center point distance of the t-th image frame, and $\text{mean}(D_t)$ denotes a mean of center point distances of all image frames; and $D = \{D_1, D_2, \ldots, D_n\}$ obtained through the preceding processing is used as the displacement information.

A computer-readable storage medium is provided. The computer-readable storage medium stores a computer program thereon. The computer program, when executed by a processor, implements following steps: in response to detecting that a vibration object exists in a monitoring video picture for a target monitoring region, a vibration object region in the monitoring video picture is determined, where the vibration object region is a region where the vibration object is located in the monitoring video picture, and where the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture; displacement information of a key point of the vibration object in the vibration object region is recorded, where that the displacement information of the key point of the vibration object in the vibration object region is recorded includes that: a distance between the key point of the vibration object and an original point in the vibration object region is respectively calculated in each image frame of the monitoring video picture, and the distance is used as a key point distance; and the key point distance corresponding to each image frame is used as the displacement information; vibration information of the vibration object in the monitoring video picture is determined based on the displacement information; and a vibration object monitoring result for the target monitoring region is generated according to the vibration information; where in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\Sigma_i^N x_i}{N}, \frac{\Sigma_i^N y_i}{N} \right),$$

where $(x_i, y_i)$ denotes coordinates in the set of edge points $L_t$, and N denotes a total number of the edge points in the set of edge points $L_t$; a distance from the center point $C_t$ to the original point, i.e., a center point distance $D_t$, is determined, wherein a calculation formula of the center point distance $D_t$ is as follows: $D_t = \sqrt{x_c^2 + y_c^2}$; a normalization process is performed on the center point distance $D_t$ of each image frame, wherein a formula of the normalization process is as follows: $D_t = D_t - \text{mean}(D_t)$, where t denotes a t-th image frame, $D_t$ denotes a center point distance of the t-th image frame, and $\text{mean}(D_t)$ denotes a mean of center point distances of all image frames; and $D = \{D_1, D_2, \ldots, D_n\}$ obtained through the preceding processing is used as the displacement information.

According to the above-described vibration object monitoring method and apparatus, the computer device and the storage medium, in response to detecting that the vibration object exists in the monitoring video picture for the target monitoring region, the vibration object region in the monitoring video picture is determined, where the vibration object region is the region where the vibration object is located in the monitoring video picture; the displacement information of the key point of the vibration object in the vibration object region is recorded; then the vibration information of the vibration object in the monitoring video picture is determined based on the displacement information; and finally, the vibration object monitoring result for the target monitoring region is generated according to the vibration information. In this way, the vibration information of the vibration object in the monitoring video picture can be accurately identified, the vibration object can be monitored based on the vibration information, and the vibration monitoring can be timely performed on the vibration object of the target monitoring region without requiring a worker to personally reach the site for full-range and full-period surveilling.

BRIEF DESCRIPTION OF DRAWINGS

FIG. 1 is a diagram of an application environment of a vibration object monitoring method according to an embodiment;

FIG. 2 is a flowchart of a vibration object monitoring method according to an embodiment;

DETAILED DESCRIPTION

Figure 3:
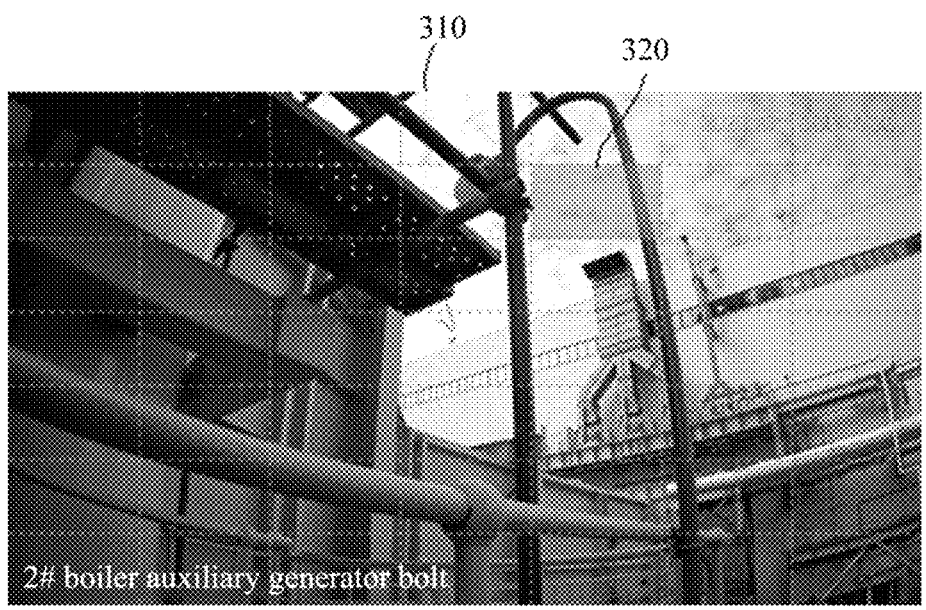
FIG. 3 is a schematic diagram of a vibration object region according to an embodiment.

In order to make objects, technical schemes and advantages of the present application more clear, the present application is further described in detail below in conjunction with accompanying drawings and embodiments. It should be understood that specific embodiments described herein are merely illustrative of the present application and are not intended to limit the present application.

The vibration object monitoring method provided in the present application may be applied to an application environment as shown in FIG. 1. A computer device 110 communicates with an image acquisition apparatus 120 over a network. If the computer device 110 detects that a vibration object exists in a monitoring video picture acquired by the image acquisition apparatus 120 for a target monitoring region, a vibration object region in the monitoring video picture is determined. The vibration object region is a region where the vibration object is located in the monitoring video picture. Then, the computer device 110 records displacement information of a key point of the vibration object in the vibration object region; the computer device 110 determines vibration information of the vibration object in the monitoring video picture based on the displacement information; and finally, the computer device 110 generates a vibration object monitoring result for the target monitoring region according to the vibration information. In a practical application, the computer device 110 may be, but is not limited to, various personal computers, notebook computers, smart phones, tablet computers, and portable wearable devices, and the image acquisition apparatus 120 may be, but is not limited to, various monitoring cameras, cameras, and the like.

In one embodiment, as shown in FIG. 2, a vibration object monitoring method is provided, an example in which the method is applied to the computer device 110 in FIG. 1 is used for description, and the method includes the steps described below.

In step S210, if it is detected that a vibration object exists in a monitoring video picture for a target monitoring region, a vibration object region in the monitoring video picture is determined.

The vibration object region is a region where the vibration object is located in the monitoring video picture.

The target monitoring region may refer to a region where a vibration monitoring is required to be performed on the vibration object.

The vibration object may refer to an object such as a pipe or a device in which the vibration may exist.

In a specific implementation, the computer device acquires a monitoring video for a target monitoring region in real time, detects the monitoring video of the target monitoring region, and determines whether the vibration object exists in the monitoring video picture. When the vibration object exists in the monitoring video picture, the computer device determines the vibration object region in the monitoring video picture.

In step S220, displacement information of a key point of the vibration object in the vibration object region is recorded.

In a specific implementation, when the computer device determines the vibration object region in the monitoring video picture, the computer device may identify the key point of the vibration object and record the displacement information of the key point in the vibration object region.

In step S230, vibration information of the vibration object in the monitoring video picture is determined based on the displacement information.

In a specific implementation, the computer device may convert the displacement information of the key point in the vibration object region into a corresponding periodic signal diagram after the computer device records the displacement information of the key point in the vibration object region, and the computer device measures the vibration information of the vibration object in the monitoring video picture based on a signal change characteristic of the periodic signal diagram. The vibration information may refer to at least one of a vibration frequency of the vibration object or a vibration amplitude of the vibration object.

In step S240, a vibration object monitoring result for the target monitoring region is generated according to the vibration information.

In a specific implementation, after the computer device determines the vibration information of the vibration object in the monitoring video picture, the computer device may generate the vibration object monitoring result for the target monitoring region based on the vibration information. For example, when the computer device determines that the vibration amplitude of the vibration object in the monitoring video picture is greater than a preset amplitude threshold, the computer device generates a vibration abnormality alarm for the vibration object.

In the vibration object monitoring method described above, if it is detected that the vibration object exists in the monitoring video picture for the target monitoring region, then the vibration object region in the monitoring video picture is determined, where the vibration object region is the region where the vibration object is located in the monitoring video picture; the displacement information of the key point of the vibration object in the vibration object region is recorded; then the vibration information of the vibration object in the monitoring video picture is determined based on the displacement information; and finally, the vibration object monitoring result for the target monitoring region is generated according to the vibration information. In this way, the vibration information of the vibration object in the monitoring video picture can be accurately identified, and the vibration object can be monitored based on the vibration information, and the vibration monitoring can be timely performed on the vibration object of the target monitoring region without requiring a worker to personally reach the site for full-range and full-period surveilling.

In another embodiment, the method further includes that: an image content change degree in the monitoring video picture is acquired; and if the image content change degree is in a preset change range, it is determined that the vibration object exists in the monitoring video picture.

In a specific implementation, the computer device may perform an image differential summation on the monitoring video of the target monitoring region through the following formula:

$$\text{Diff}_i = \Sigma(|I_i - I_{i-1}|).$$

$I_i$ denotes an i-th frame of sampled image, $I_{i-1}$ denotes an (i−1)-th frame of sampled image, the magnitude is H×w×C, and $\Sigma$ denotes a sum of absolute values of all pixel points of a differential image.

N (such as, N=60) frames of images are selected, the image Ii is extracted every n (such as, n=5) frames of the N frames of images, and a difference between adjacent sampled frames is calculated. If a sum $$\sum_{i}^{\frac{N}{n}} Diff_i$$

of differences of N/n sampled images is within a set threshold interval ($\theta_{diff_1}$, $\theta_{diff_2}$), then it is considered that the vibration object exists within a region captured by the camera, and thus the vibration measurement is performed subsequently.

According to the technical scheme of this embodiment, the image content change degree in the monitoring video picture is acquired, and whether the image content change degree is in the preset change range is determined, so that whether the vibration object exists in the monitoring video picture is determined accurately and quickly.

In another embodiment, that the vibration object region in the monitoring video picture is determined includes that: the monitoring video picture is divided into multiple candidate regions; an image content change degree corresponding to each of the multiple candidate regions in the monitoring video picture is acquired; and a candidate region with a highest image content change degree is used as the vibration object region.

In a specific implementation, in a process of determining the vibration object region in the monitoring video picture by the computer device, the following is included: the computer device divides the monitoring video picture into multiple candidate regions; then the computer device acquires an image content change degree corresponding to each of the multiple candidate regions in the monitoring video picture; and finally, the computer device uses a candidate region with a highest image content change degree as the vibration object region.

Specifically, for a video in which the existence of the vibration object has been determined, the video is subjected to gridding and divided into m×n grids. The m×n grids are determined one by one, a region with the largest difference pixel value change is determined, and this region is used as the vibration object region. For ease of understanding by those skilled in the art, FIG. 3 provides a schematic diagram of the vibration object region, in which reference number 310 denotes the monitoring video picture, and reference number 320 denotes the vibration object region.

According to the technical scheme of this embodiment, the monitoring video picture is divided into the multiple candidate regions; the image content change degree corresponding to each of the multiple candidate regions in the monitoring video picture is acquired; and the candidate region with the highest image content change degree is used as the vibration object region. In this way, the vibration object region in the monitoring video picture can be determined quickly and accurately.

In another embodiment, that the displacement information of the key point of the vibration object in the vibration object region is recorded includes that: a distance between the key point of the vibration object and an original point in the vibration object region is calculated in each image frame of the monitoring video picture, respectively, and the distance is used as a key point distance; and the key point distance corresponding to each image frame is used as the displacement information.

The key point of the vibration object may refer to the center point of the vibration object.

In a specific implementation, the computer device may respectively calculate a distance between the key point of the vibration object and an original point in the vibration object region in each image frame of the monitoring video picture, use the distance as a key point distance, and use the key point distance corresponding to each image frame as the displacement information.

Figure 4A:
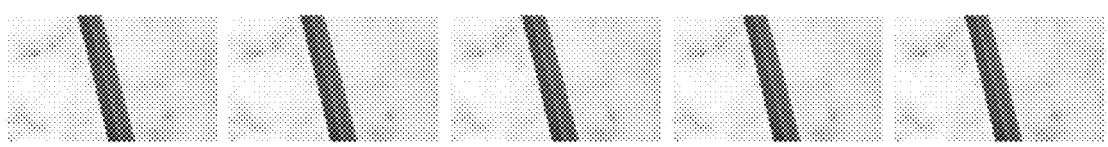
FIG. 4A is a schematic diagram of a color image frame corresponding to a vibration object region according to an embodiment.

Specifically, the computer device may crop the vibration object region in the monitoring video for calculation, and the first five frames of color images are taken here as an example. As shown in FIG. 4A, FIG. 4A provides a schematic diagram of a color image frame corresponding to the vibration object region.

Then, the computer device sequentially segments the image frame sequence obtained after the cropping to obtain left and right edges of the vibration object, and then calculates and detects a center point of the edges of the vibration object as a center point of the object. The specific steps are as follows: the vibration object is segmented by adopting an OTSU (efficient algorithm for binarizing an image proposed by the Japanese scholar OTSU in 1979) threshold segmentation algorithm to obtain left and right edges of a rod, where specific steps are as follows.

Figure 4B:
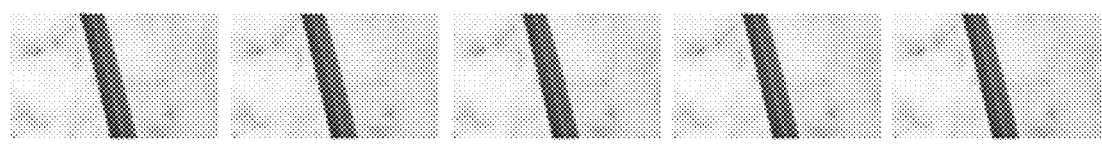
FIG. 4B is a schematic diagram of a gray scale image frame corresponding to a vibration object region according to an embodiment.

First, images in the image sequence obtained after the cropping are subjected to a gray scale processing, to convert color images into gray scale images and obtain converted gray scale images. As shown in FIG. 4B, FIG. 4B provides a schematic diagram of a gray scale image frame corresponding to the vibration object region.

Figure 4C:
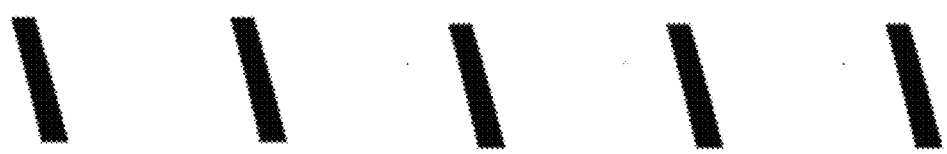
FIG. 4C is a schematic diagram of a segmented image frame corresponding to a vibration object region according to an embodiment.

Then, a segmentation threshold for the foreground and background is calculated using a conventional OSTU algorithm, and a segmented image is obtained by selection of an adaptive threshold, for example, the adaptive threshold may be selected as 162. As shown in FIG. 4C, FIG. 4C provides a schematic diagram of a segmented image frame corresponding to the vibration object region.

Then, coordinates of all pixel points of the left and right edges are determined by the edge search, these edge points are denoted as $L_t$, and the specific calculation method is as follows:

$$L_t \in \{(x,y);(x,y) \text{ in the border}\}$$

$L_t$ denotes an edge point, t denotes a t-th frame of image, and (x, y) denotes a coordinate of a pixel point. Examples of coordinate points for the first five example images are given below.

$$L_1 \in \{(91,0),(91,2),(91,3), \ldots\};$$

$$L_2 \in \{(90,0),(91,1),(91,4), \ldots\};$$

$$L_3 \in \{(90,0),(90,2),(91,3), \ldots\};$$

$$L_4 \in \{(90,0),(90,2),(91,3), \ldots\};$$

$$L_5 \in \{(90,0),(90,1),(91,2), \ldots\}.$$

Then, the distance between the key point of the vibration object and the original point in the vibration object region is calculated, the distance is used as the key point distance, and the key point distance corresponding to each image frame is used as the displacement information.

Specifically, when the key point of the vibration object is the center point, the center point $C_t$ of the vibration object of each frame of image may be calculated according to a set of edge points $L_t$ obtained for each frame of image, and the calculation formulation is as follows:

$$C_t = (x_c, y_c) = \left( \frac{\sum_i^N x_i}{N}, \frac{\sum_i^N y_i}{N} \right).$$

$(x_i, y_i)$ denotes the coordinates in the set of edge points $L_t$, and N denotes a total number of edge points.

A distance from the center point coordinate $C_t$ to the original point, i.e., a center point distance $D_t$, is calculated to convert the coordinate into the distance, and the calculation formula is as follows:

$$D_t = \sqrt{\vec{x_c^2 + y_c^2}}.$$

Then, for the calculated center point distance $D_t$ of each frame, a simple normalization process is performed and then a mean of all moments $D_t$ is subtracted to obtain a final value. The formula is as follows:

$$D_t = D_t - \text{mean}(D_t)$$

$D_t$ denotes the center point distance of each frame, and mean($D_t$) denotes the mean of all moments $D_t$. By means of the above processing, the distances Dt={0.282, 0.025, −0.031, −0.039, −0.45; 0<t≤5} of the first five frames are finally obtained as the displacement information.

According to the technical scheme of this embodiment, the distance between the key point of the vibration object and the original point in the vibration object region is calculated in each image frame of the monitoring video picture, respectively, and the distance is used as the key point distance; and the key point distance corresponding to each image frame is used as the displacement information.

In another embodiment, that the vibration information of the vibration object in the monitoring video picture is determined based on the displacement information includes that: a vibration periodic signal for the vibration object is plotted according to the key point distance corresponding to each image frame; and a vibration amplitude of the vibration object and a vibration frequency of the vibration object are determined according to the vibration periodic signal.

In a specific implementation, in a process in which the computer device determines the vibration information of the vibration object in the monitoring video picture based on the displacement information, the following is included: the computer device may plot the vibration periodic signal for the vibration object according to the key point distance corresponding to each image frame.

Figure 5:
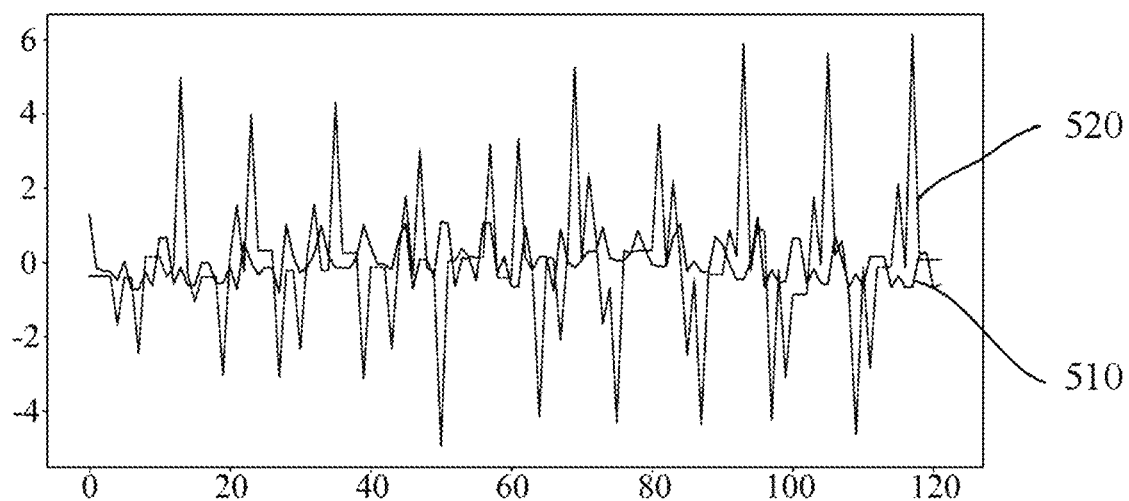
FIG. 5 is a schematic diagram of a vibration periodic signal according to an embodiment.

Continuing with the above example, after the computer device acquires the center point distance $D_t$ of each frame of the vibration object, the computer device may obtain the periodic signal of the coordinates of the center point of the vibration object in the frame sequence. Specifically, the computer device may arrange the center point distance $D_t$ of each frame in order of time t to obtain a sequence (t, $D_t$) obtained by sampling, where $D_t$ is a response value at a moment t, and the responsive periodic signal is plotted with t as the horizontal axis and $D_t$ as the vertical axis. For ease of understanding by those skilled in the art, FIG. 5 provides a vibration periodic signal, and as shown in FIG. 5, reference number 510 denotes a responsive periodic signal, and reference number 520 denotes a periodic signal of the shown motion after being amplified.

Finally, the computer device determines the vibration amplitude and the vibration frequency of the vibration object according to the vibration periodic signal. Specifically, for a curve in the obtained periodogram of the center point of the vibration object, all peak points on the curve are found and are denoted as a set P. All peak points in P are averaged to obtain the vibration amplitude A. For the vibration object measured correspondingly as shown in FIG. 5, the vibration amplitude may be measured as about 1.5 pixels by this method.

The calculation of the frequency of the object vibration is generally divided into two types, that is, 1) a number of peaks at the measurement time is directly counted and divided by corresponding time to be the frequency; however, in this method, the counted number of peaks is prone to be inaccurate due to the noise of the signal, which affects the effect of the final frequency measurement, so that this method is not used for calculating the frequency; and 2) the counting is performed in the frequency domain, and a more accurate frequency is obtained by calculating the power spectrum, so that this method is selected to calculate the frequency of the vibration object in the present disclosure.

The definition of the power spectrum is a signal power within a unit frequency band. A horizontal axis of a curve of the power spectrum is the frequency, and the vertical axis of the curve of the power spectrum is a magnitude of the power. According to the signal and system theory, the power spectrum of the periodic signal spikes at a corresponding frequency. The complex process of counting peak values may be omitted by performing the calculation through the power spectrum, and some noises of a time domain may be omitted on the frequency domain, so that the measurement result is more accurate.

Figure 6:
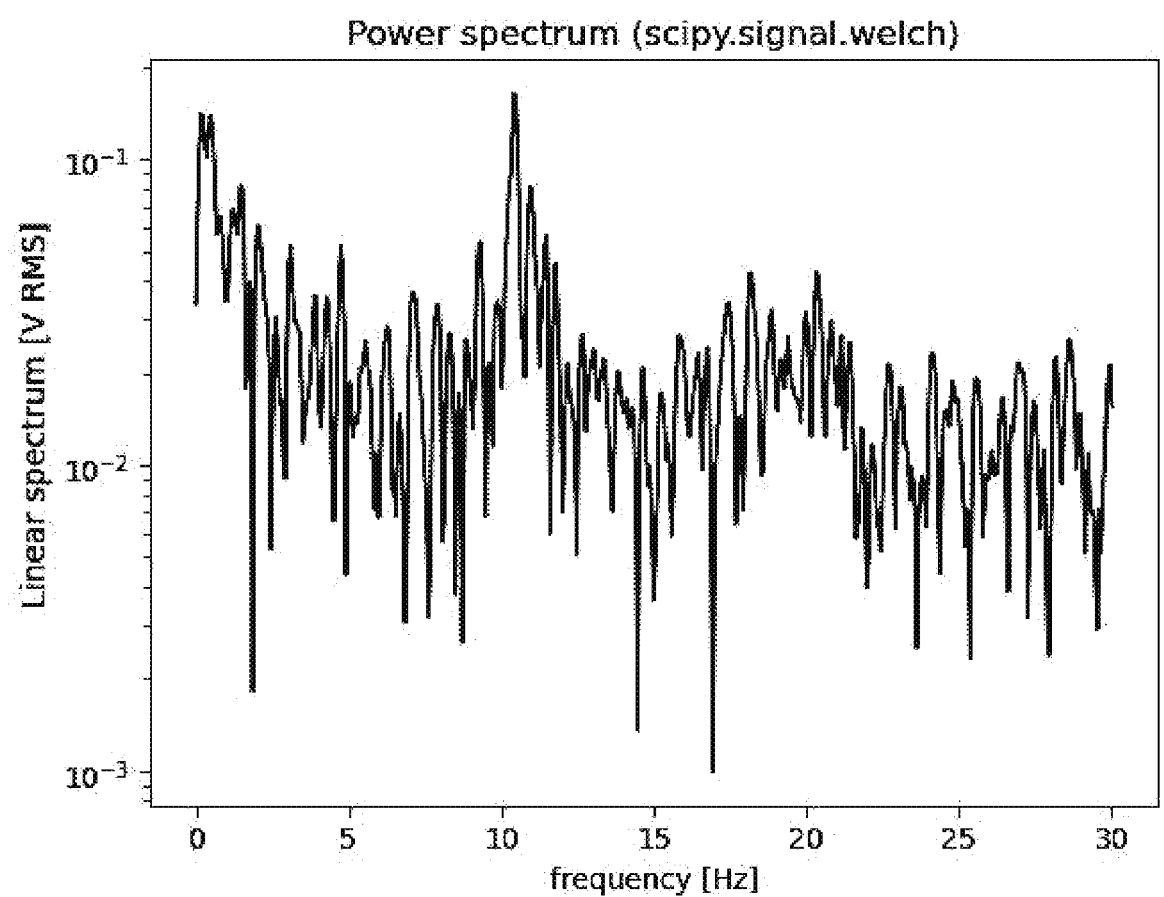
FIG. 6 is a schematic diagram of a power spectrum of a vibration periodic signal according to an embodiment.

The computer device may convert the vibration periodic signal into the power spectrum as shown in FIG. 6, and the vibration frequency may be derived by observing the abscissa frequency corresponding to the highest peak of the power spectrum. For example, based on the power spectrum as shown in FIG. 6, the vibration frequency of the vibration object may be measured to be about 10 Hz.

According to the technical scheme of this embodiment, the vibration periodic signal for the vibration object is plotted according to the key point distance corresponding to each image frame, so that the vibration amplitude and the vibration frequency of the vibration object can be accurately determined based on the vibration periodic signal.

In another embodiment, the vibration information includes a vibration amplitude of the vibration object and a vibration frequency of the vibration object, and that the vibration object monitoring result for the target monitoring region is generated according to the vibration information includes that: if the vibration amplitude is greater than a preset amplitude threshold, and/or if the vibration frequency is greater than a preset frequency threshold, then vibration abnormality alarm information for the vibration object is generated, and the vibration abnormality alarm information is used as the vibration object monitoring result.

The vibration information includes a vibration amplitude A of the vibration object and a vibration frequency f of the vibration object in the video monitoring picture.

In a specific implementation, in a process in which the computer device generates the vibration object monitoring result for the target monitoring region according to the vibration information, the following is included: the computer device may determine whether the vibration amplitude A is greater than a preset amplitude threshold At, and/or whether the vibration frequency f is greater than a preset frequency threshold ft. When the computer device determines that the vibration amplitude A of the vibration object is greater than the preset amplitude threshold At, and/or the vibration frequency f of the vibration object is greater than the preset frequency threshold ft, the computer device generates vibration abnormality alarm information for the vibration object, and the vibration abnormality alarm information is used as the vibration object monitoring result.

According to the technical scheme of this embodiment, if the vibration amplitude is greater than the preset amplitude threshold and/or the vibration frequency is greater than the preset frequency threshold, then the vibration abnormality warning information for the vibration object is generated timely and accurately, facilitating the user to perform operations such as inspection and maintenance on the vibration object in time.

In another embodiment, when the vibration object is a pipeline, that the vibration abnormality alarm information for the vibration object is generated includes that: pipeline color information of the pipeline in the monitoring video picture is identified, and region type information of the target monitoring region is acquired; pipeline type information and pipeline working medium information corresponding to the pipeline are inquired according to the pipeline color information and the region type information; and alarm information including the pipeline type information, the pipeline working medium information and the vibration information is generated, and the alarm information is used as the vibration abnormality alarm information.

The region type information may include at least one of a storage power plant, a conventional hydroelectric power plant, or a gas power plant.

In a specific implementation, when the vibration object is a pipeline, in a process in which the computer device generates the vibration abnormality warning information for the vibration object, the following is included: the computer device may identify pipeline color information of the pipeline in the monitoring video picture, and acquire region type information of the target monitoring region. Specifically, the computer device may obtain a color image of the vibration object and RGB color space coordinate values (R, G, B) of one of pixel points belonging to the foreground (vibration pipeline) in the color image, and then convert the RGB color value into a hexadecimal color code, whereby the color of the pipeline is obtained.

The computer device then queries the pipeline type information and the pipeline working medium information corresponding to the pipeline according to the pipeline color information and the region type information.

Specifically, when the region type information is the storage power plant, the following pipeline type determination is performed according to the color.

If the identified color is blue, then the pipeline type is a water supply pipe and the working medium is water.

If the identified color is green, then the pipeline type is a drain pipe and the working medium is water.

If the identified color is yellow, then the pipeline type is pressure oil return pipe and the working medium is oil.

Figure 7A:
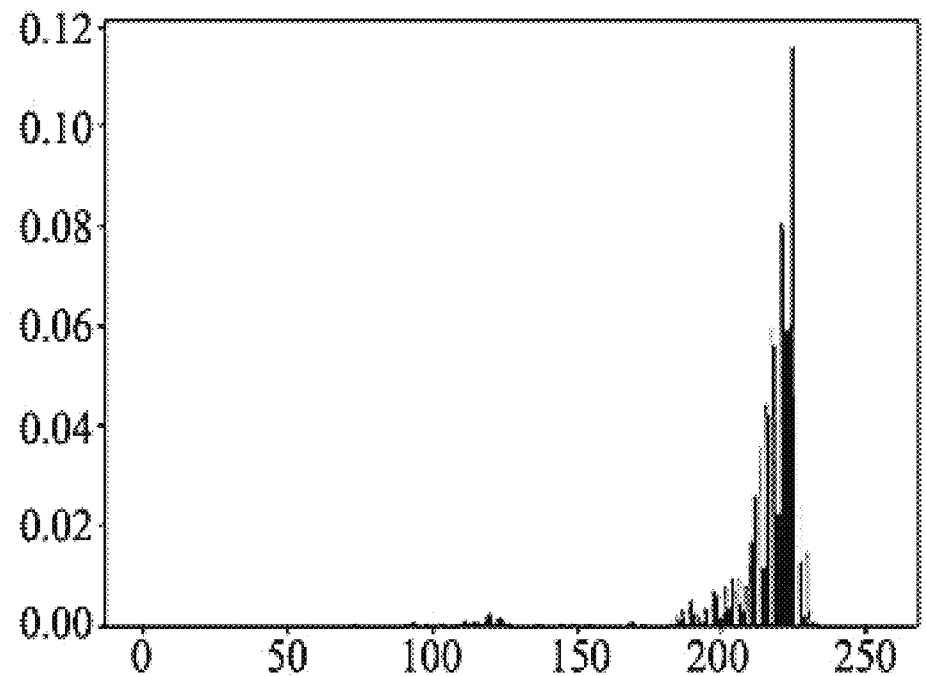
FIG. 7A is a first histogram according to an embodiment.
Figure 7B:
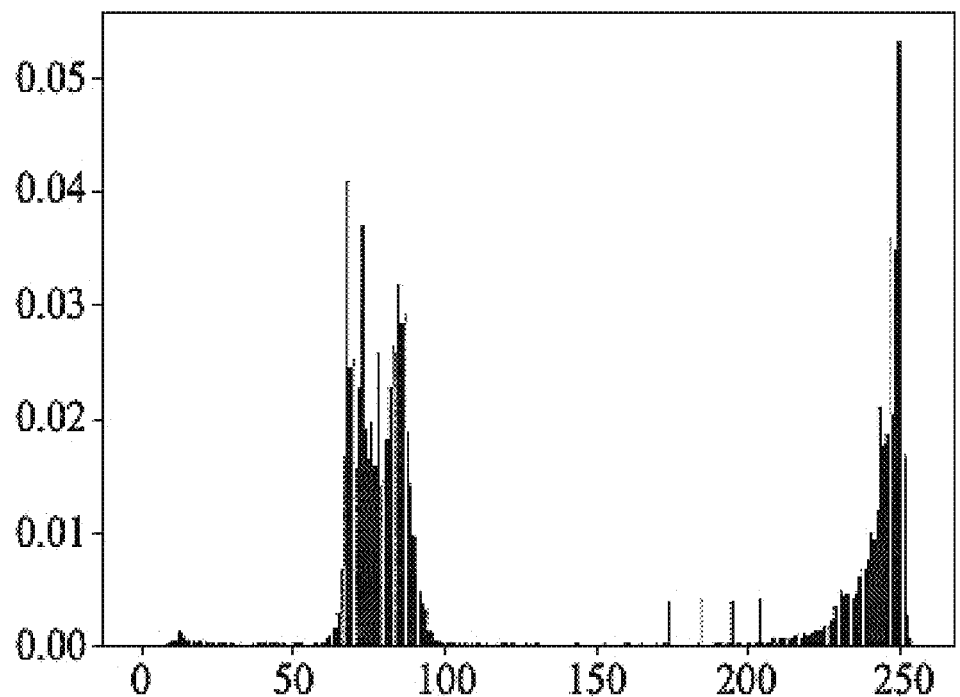
FIG. 7B is a second histogram according to an embodiment.

If the identified color is white, then the gray scale image of the vibration object is subjected to a gray scale histogram statistics: if only one wave peak occurs in the histogram, as shown in the first histogram of FIG. 7A, then it is determined that the pipeline type is a gas supply pipe and the working medium is gas; if two wave peaks occur in the histogram, as shown in the second histogram of FIG. 7B, then the pipeline type is a fire pipe and the working medium is water.

Figure 7C:
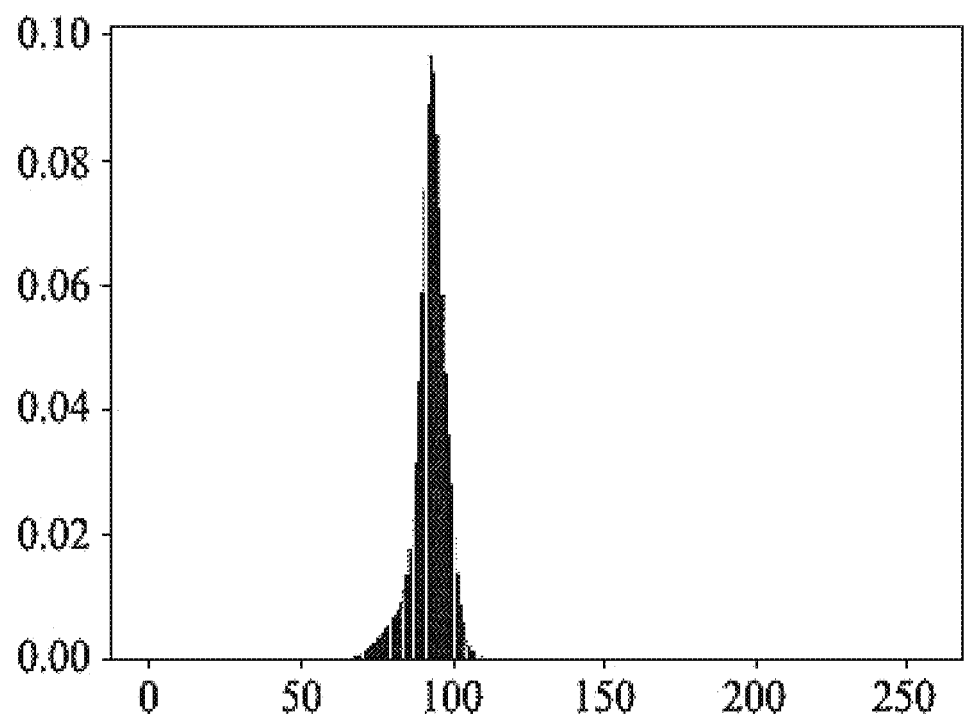
FIG. 7C is a third histogram according to an embodiment.

If the identified color is red, then the gray scale image of the vibration object is subjected to a gray scale histogram statistics: if only one wave peak occurs in the histogram, as shown in the third histogram of FIG. 7C, then the pipeline type is a pressure oil permeable pipe and the working medium is oil; if two wave peaks occur in the histogram, as shown in the second histogram of FIG. 7B, then the pipeline type is a fire pipe and the working medium is water.

It should be noted that if the identified color is not the above-described color, then the pipeline type is an unknown type pipeline and the working medium is an unknown working medium.

When the region type information is a conventional hydropower plant, the following pipeline type determination is performed according to the color.

If the identified color is blue, then the pipeline type is a gas pipe and the working medium is gas.

If the identified color is yellow, then the pipeline type is a return oil pipe and the working medium is oil.

If the identified color is red, then the gray scale image of the vibration object is subjected to a gray scale histogram statistics: if only one wave peak occurs in the histogram, as shown in the third histogram of FIG. 7C, then the pipeline type is an oil supply pipe and the working medium is oil; if two wave peaks occur in the histogram, as shown in the second histogram of FIG. 7B, then the pipeline type is a fire water pipe and the working medium is water.

If the identified color is white, then the pipeline type is a fire water pipe and the working medium is water.

If the identified color is not the above-described color, then the pipeline type is an unknown type pipe and the working medium is an unknown working medium.

When the region type information is the gas power plant, the following pipeline type determination is performed according to the color.

If the identified color is blue, then the pipeline type is a compressed air pipe and the working medium is air.

If the identified color is yellow, then the pipeline type is a natural gas pipe and the working medium is natural gas.

If the identified color is silver, then the pipeline type is a steam pipe and the working medium is steam.

If the identified color is black, then the pipeline type is a circulating water pipe and the working medium is water.

If the identified color is green, then the pipeline type is a desalinated water pipe and the working medium is water.

If the identified color is not the above-described color, then the pipeline type is an unknown type pipe and the working medium is an unknown working medium.

Finally, the computer device generates the alarm information including the pipeline type information, the pipeline working medium information and the vibration information, and the alarm information is used as the vibration abnormality alarm information, that is, the computer device outputs the alarm information in a form of pipeline type+working medium+amplitude+frequency.

According to the technical scheme of this embodiment, the pipeline color information of the pipeline in the monitoring video picture is identified, and the region type information of the target monitoring region is acquired; the pipeline type information and the pipeline working medium information corresponding to the pipeline are inquired according to the pipeline color information and the region type information; and the alarm information including the pipeline type information, the pipeline working medium information and the vibration information is generated, and the alarm information is used as the vibration abnormality alarm information. In this way, the user can timely determine the vibration object in which the vibration abnormality exists and know the pipeline type information and the pipeline working medium information of the vibration pipe based on the alarm information.

Figure 8:
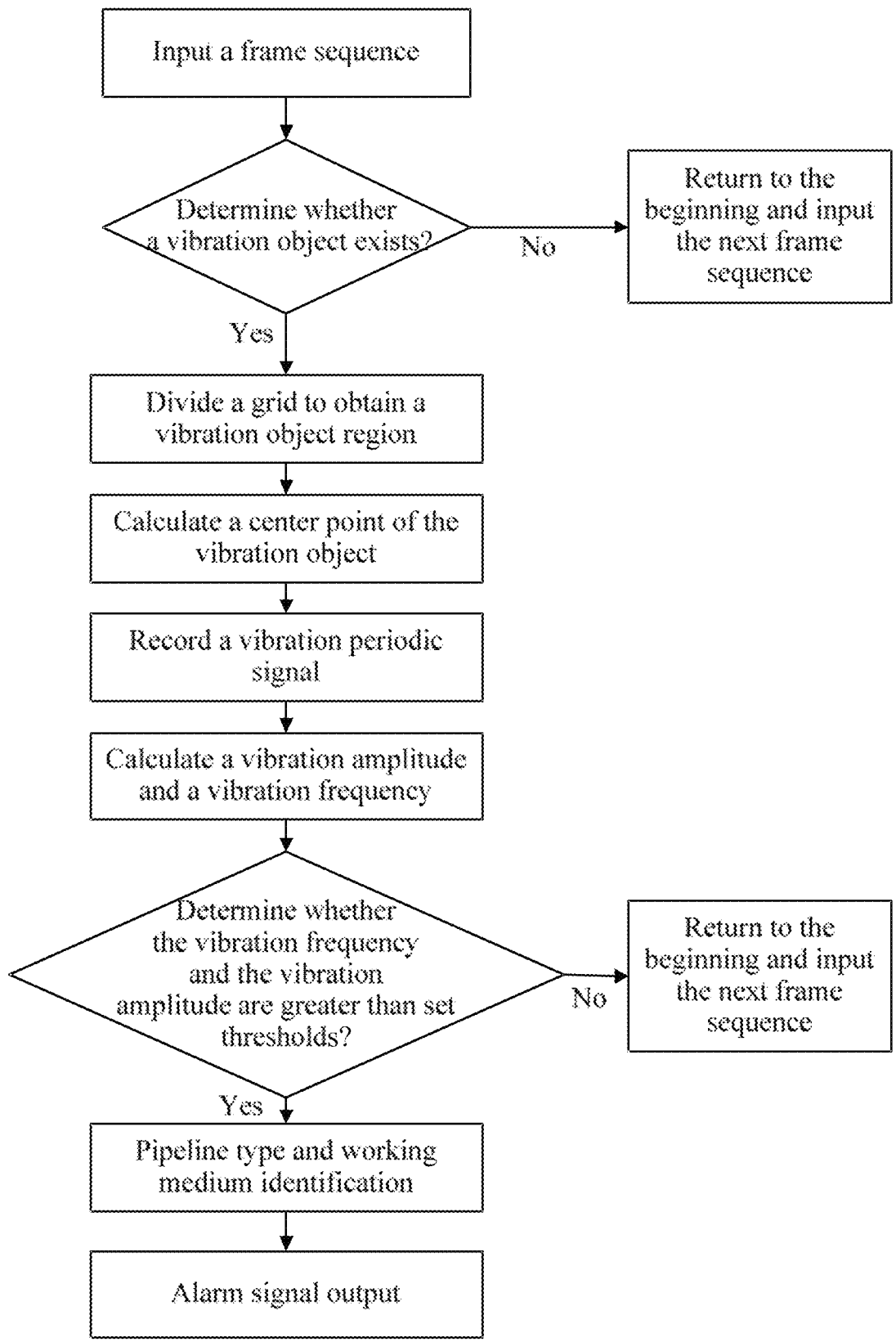
FIG. 8 is a flowchart of a process of a vibration object monitoring method according to an embodiment.

In order to facilitate understanding by those skilled in the art, FIG. 8 provides a flowchart of a process of a vibration object monitoring method. Firstly, an image frame sequence of a monitoring video is input; then, a computer device determines whether a vibration object exists in this image frame sequence, if no vibration object exists in the image frame sequence, then it returns to the beginning and the next frame sequence is input, and if the vibration object exists in the image frame sequence, then the video monitoring picture is divided into grids to obtain a vibration object region; a center point of the vibration object is calculated, and the vibration periodic signal of the vibration object is recorded; then, the computer device calculates a vibration amplitude and a vibration frequency based on the vibration periodic signal. When the computer device determines that the vibration amplitude and the vibration frequency are greater than set thresholds, the type of the vibration object and the working medium are determined, and alarm information is output. When the vibration amplitude and the vibration frequency are less than or equal to the set thresholds, then it returns to the beginning and the next frame sequence is input.

It should be understood that while various steps in the flowcharts of FIGS. 2 and 8 are shown sequentially as indicated by the arrows, these steps are not necessarily performed sequentially in the order indicated by the arrows. These steps are performed without a strict order limitation and the steps may be performed in other orders unless explicitly stated herein. Moreover, at least some of steps in FIGS. 2 and 8 may include multiple steps or stages, these steps or stages are not necessarily performed at the same time, but may be performed at different times, the order of execution of these steps or stages is not necessarily performed sequentially, but may be performed in turn or alternately with other steps or at least a portion of steps or stages in other steps.

Figure 9:
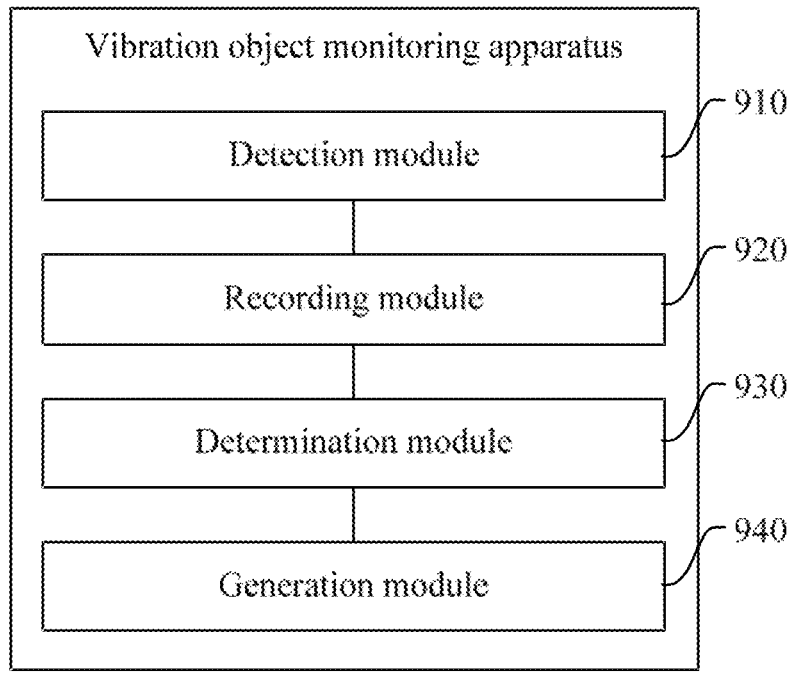
FIG. 9 is a structural block diagram of a vibration object monitoring apparatus according to an embodiment.

In one embodiment, as shown in FIG. 9, a vibration object monitoring apparatus is provided. The vibration object monitoring apparatus includes a detection module 910, a recording module 920, a determination module 930 and a generation module 940.

The detection module 910 is configured to determine a vibration object region in a monitoring video picture if it is detected that a vibration object exists in the monitoring video picture for a target monitoring region, where the vibration object region is a region where the vibration object is located in the monitoring video picture. The recording module 920 is configured to record displacement information of a key point of the vibration object in the vibration object region. The determination module 930 is configured to determine vibration information of the vibration object in the monitoring video picture based on the displacement information. The generation module 940 is configured to generate a vibration object monitoring result for the target monitoring region according to the vibration information.

In one embodiment, the vibration object monitoring apparatus further includes an acquisition module and a decision module. The acquisition module is configured to acquire an image content change degree in the monitoring video picture. The decision module is configured to determine that the vibration object exists in the monitoring video picture if the image content change degree is in a preset change range.

In one embodiment, the detection module 910 is configured to: divide the monitoring video picture into multiple candidate regions; acquire an image content change degree corresponding to each of the multiple candidate regions in the monitoring video picture; and use a candidate region with a highest image content change degree as the vibration object region.

In one embodiment, the recording module 920 is configured to: respectively calculate, in each image frame of the monitoring video picture, a distance between the key point of the vibration object and an original point in the vibration object region, and use the distance as a key point distance; and use the key point distance corresponding to each image frame as the displacement information.

In one embodiment, the determination module 930 is configured to: plot a vibration periodic signal for the vibration object according to the key point distance corresponding to each image frame; and determine a vibration amplitude of the vibration object and a vibration frequency of the vibration object according to the vibration periodic signal.

In one embodiment, the vibration information includes a vibration amplitude of the vibration object and a vibration frequency of the vibration object, and the generation module 940 is configured to: if the vibration amplitude is greater than a preset amplitude threshold, and/or the vibration frequency is greater than a preset frequency threshold, generate vibration abnormality alarm information for the vibration object, and use the vibration abnormality alarm information as the vibration object monitoring result.

In one embodiment, when the vibration object is a pipeline, the generation module 940 is configured to: identify pipeline color information of the pipeline in the monitoring video picture, and acquire region type information of the target monitoring region; inquire pipeline type information and pipeline working medium information corresponding to the pipeline according to the pipeline color information and the region type information; and generate alarm information including the pipeline type information, the pipeline working medium information and the vibration information, and use the alarm information as the vibration abnormality alarm information.

For a specific definition of a vibration object monitoring apparatus, reference may be made to the above definition of the vibration object monitoring method, which is not described in detail herein. The modules in the vibration object monitoring apparatus described above may be wholly or partially achieved by software, hardware and a combination thereof. The modules may be embedded in a hardware form or independent of a processor in a computer device, and may also be stored in a memory in the computer device in a software form, so that the processor can call and execute operations corresponding to the above modules.

Figure 10:
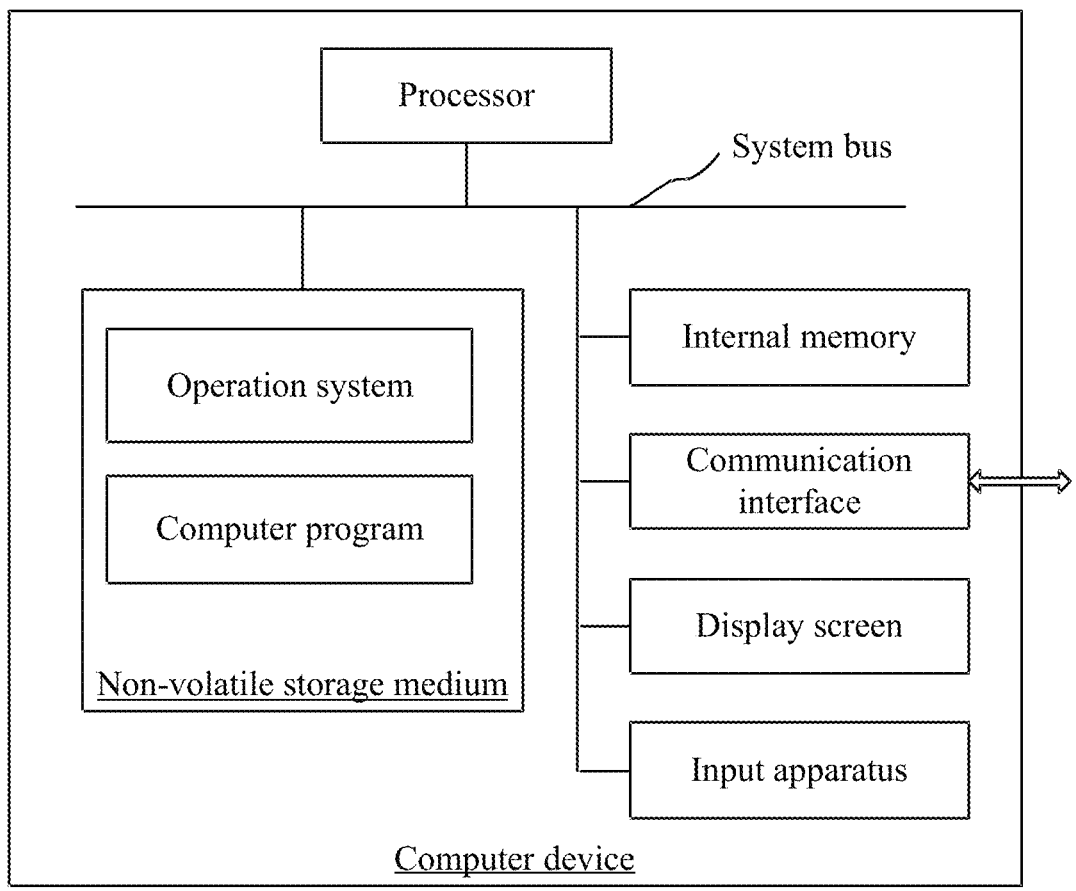
FIG. 10 is a diagram of an internal structure of a computer device according to an embodiment.

In one embodiment, a computer device is provided. The computer device may be a terminal, a diagram of an internal structure of the computer device may be as shown in FIG. 10. The computer device includes a processor, a memory, a communication interface, a display screen and an input apparatus connected by a system bus. The processor of the computer device is configured to provide calculating and control capabilities. The memory of the computer device includes a non-volatile storage medium and an internal memory. The non-volatile storage medium stores an operation system and a computer program. The internal memory provides an environment for the operation system and the running of the computer program in the non-volatile storage medium. The communication interface of the computer device is configured to communicate with an external terminal in a wired or wireless manner, the wireless manner may be implemented by Wi-Fi, carrier network, near field communication (NFC) or other technologies. The computer program, when executed by a processor, implements the vibration object monitoring method. The display screen of the computer device may be a liquid crystal display screen or an electronic ink display screen, and the input apparatus of the computer device may be a touch layer overlaid on the display screen, may be a key pad, a trackball or a trackpad disposed on the housing of the computer device, or may be an external keyboard, an external trackpad or an external mouse and the like.

It should be understood by those skilled in the art that the structure shown in FIG. 10 is merely a block diagram of a part of the structure relevant to schemes of the present application, and does not constitute a limitation of the computer device to which the schemes of the present application is applied. Specifically, the computer device may include more or fewer components than those shown in the drawings, or combine certain components, or have different arrangements of components.

In one embodiment, a computer device is provided. The computer device includes a memory and a processor. The memory stores a computer program, and the computer program, when executed by the processor, causes the processor to perform the steps of the vibration object monitoring method described above. The steps of the vibration object monitoring method herein may be the steps of the vibration object monitoring method of various embodiments described above.

In one embodiment, a computer-readable storage medium is provided. The computer-readable storage medium stores a computer program. The computer program, when executed by a processor, causes the processor to perform the steps of the vibration object monitoring method described above. The steps of the vibration object monitoring method herein may be the steps of the vibration object monitoring method of various embodiments described above.

It should be understood by those of ordinary skill in the art that all or part of the flows in the methods of the above-described embodiments may be implemented through the computer program being instructing a relevant hardware, and the computer program may be stored in a non-volatile computer-readable storage medium. The computer program, when executed, may include the flows of embodiments of the methods described above. Any reference to memories, storages, databases, or other media used in various embodiments provided by the present application may include at least one of the non-volatile memory or the volatile memory. The non-volatile memory may include a read-only memory (ROM), a magnetic tape, a floppy disk, a flash memory, an optical memory or the like. The volatile memory may include a random-access memory (RAM) or an external cache memory. By way of illustration and not limitation, the RAM may take many forms such as a static random access memory (SRAM) or a dynamic random access memory (DRAM).

Each of technical features of the above embodiments may be combined arbitrarily, and all possible combinations of each of technical features in the above-described embodiments are not described in order to make the description concise. As long as the combinations of these technical features have no contradiction, it should be regarded as the scope recited in the present description.

The above-described embodiments only express several implementations of the present application, and the description thereof is specific and detailed, but not to be understood as limiting the scope of the present disclosure. It should be noted that various changes and modifications may be made by those of ordinary skill in the art without departing from the concept of the present application, and these changes and modifications are all within the scope of protection of the present application. Therefore, the scope of protection of the present application should be governed by the appended claims.

What is claimed is:

1. A vibration object monitoring method, comprising:
in response to detecting that a vibration object exists in a monitoring video picture for a target monitoring region, determining a vibration object region in the monitoring video picture, wherein the vibration object region is a region where the vibration object is located in the monitoring video picture; and wherein the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture;

recording displacement information of a key point of the vibration object in the vibration object region, wherein recording the displacement information of the key point of the vibration object in the vibration object region comprises: respectively calculating, in each image frame of the monitoring video picture, a distance between the key point of the vibration object and an original point in the vibration object region, and using the distance as a key point distance; and using the key point distance corresponding to each image frame as the displacement information;

determining vibration information of the vibration object in the monitoring video picture based on the displacement information; and generating a vibration object monitoring result for the target monitoring region according to the vibration information;

wherein in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\Sigma_i^N x_i}{N}, \frac{\Sigma_i^N y_i}{N} \right)$$

wherein $(x_i, y_i)$ denotes coordinates in the set of edge points $L_t$, and N denotes a total number of the edge points in the set of edge points $L_t$;

wherein a distance from the center point $C_t$ to the original point, i.e., a center point distance $D_t$, is determined, wherein a calculation formula of the center point distance $D_t$ is as follows:

$$D_t = \sqrt{x_c^2 + y_c^2}$$

wherein a normalization process is performed on the center point distance $D_t$ of each image frame, wherein a formula of the normalization process is as follows:

$$D_t = D_t - \text{mean}(D_t)$$

wherein t denotes a t-th image frame, $D_t$ denotes a center point distance of the t-th image frame, and $\text{mean}(D_t)$ denotes a mean of center point distances of all image frames; and wherein $D = \{D_1, D_2, \ldots, D_n\}$ obtained through the preceding processing is used as the displacement information.

2. The method of claim 1, further comprising:
acquiring an image content change degree in the monitoring video picture; and
in response to determining that the image content change degree is in a preset change range, determining that the vibration object exists in the monitoring video picture.

3. The method of claim 1, wherein determining the vibration object region in the monitoring video picture comprises:
dividing the monitoring video picture into a plurality of candidate regions;
acquiring an image content change degree corresponding to each of the plurality of candidate regions in the monitoring video picture; and
using a candidate region with a highest image content change degree as the vibration object region.

4. The method of claim 1, wherein determining the vibration information of the vibration object in the monitoring video picture based on the displacement information comprises:
plotting a vibration periodic signal for the vibration object according to the key point distance corresponding to each image frame; and
determining a vibration amplitude of the vibration object and a vibration frequency of the vibration object according to the vibration periodic signal.

5. The method of claim 1, wherein the vibration information comprises a vibration amplitude of the vibration object and a vibration frequency of the vibration object, and wherein generating the vibration object monitoring result for the target monitoring region according to the vibration information comprises:
in response to determining at least one of the following: the vibration amplitude being greater than a preset amplitude threshold, or the vibration frequency being greater than a preset frequency threshold, generating vibration abnormality alarm information for the vibration object, and using the vibration abnormality alarm information as the vibration object monitoring result.

6. The method of claim 5, wherein in a case where the vibration object is a pipeline, generating the vibration abnormality alarm information for the vibration object comprises:
identifying pipeline color information of the pipeline in the monitoring video picture, and acquiring region type information of the target monitoring region;
inquiring pipeline type information and pipeline working medium information corresponding to the pipeline according to the pipeline color information and the region type information; and
generating alarm information comprising the pipeline type information, the pipeline working medium information, and the vibration information, and using the alarm information as the vibration abnormality alarm information.

7. A computer device, comprising a memory and a processor, wherein the memory stores a computer program, and the computer program, when executed by the processor, implements:
in response to detecting that a vibration object exists in a monitoring video picture for a target monitoring region, determining a vibration object region in the monitoring video picture, wherein the vibration object region is a region where the vibration object is located in the monitoring video picture; and wherein the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture;
recording displacement information of a key point of the vibration object in the vibration object region, wherein recording the displacement information of the key point of the vibration object in the vibration object region comprises: respectively calculating, in each image frame of the monitoring video picture, a distance between the key point of the vibration object and an original point in the vibration object region, and using the distance as a key point distance; and using the key point distance corresponding to each image frame as the displacement information;
determining vibration information of the vibration object in the monitoring video picture based on the displacement information; and
generating a vibration object monitoring result for the target monitoring region according to the vibration information;
wherein in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\sum_i^N x_i}{N}, \frac{\sum_i^N y_i}{N} \right)$$

wherein $(x_i, y_i)$ denotes coordinates in the set of edge points $L_t$, and N denotes a total number of the edge points in the set of edge points $L_t$;
wherein a distance from the center point $C_t$ to the original point, i.e., a center point distance $D_t$, is determined, wherein a calculation formula of the center point distance $D_t$ is as follows:

$$D_t = \sqrt{x_c^2 + y_c^2}$$

wherein a normalization process is performed on the center point distance $D_t$ of each image frame, wherein a formula of the normalization process is as follows:

$$D_t = D_t - \text{mean}(D_t)$$

wherein t denotes a t-th image frame, $D_t$ denotes a center point distance of the t-th image frame, and mean($D_t$) denotes a mean of center point distances of all image frames; and wherein D={$D_1$, $D_2$, . . . , $D_n$} obtained through the preceding processing is used as the displacement information.

8. The computer device of claim 7, wherein the computer program, when executed by the processor, further implements:

acquiring an image content change degree in the monitoring video picture; and in response to determining that the image content change degree is in a preset change range, determining that the vibration object exists in the monitoring video picture.

9. The computer device of claim 7, wherein the computer program, when executed by the processor, implements determining the vibration object region in the monitoring video picture in the following way:

dividing the monitoring video picture into a plurality of candidate regions;

acquiring an image content change degree corresponding to each of the plurality of candidate regions in the monitoring video picture; and using a candidate region with a highest image content change degree as the vibration object region.

10. The computer device of claim 7, wherein the computer program, when executed by the processor, implements determining the vibration information of the vibration object in the monitoring video picture based on the displacement information in the following way:

plotting a vibration periodic signal for the vibration object according to the key point distance corresponding to each image frame; and determining a vibration amplitude of the vibration object and a vibration frequency of the vibration object according to the vibration periodic signal.

11. The computer device of claim 7, wherein the vibration information comprises a vibration amplitude of the vibration object and a vibration frequency of the vibration object, and wherein the computer program, when executed by the processor, implements generating the vibration object monitoring result for the target monitoring region according to the vibration information in the following way:

in response to determining at least one of the following: the vibration amplitude being greater than a preset amplitude threshold, or the vibration frequency being greater than a preset frequency threshold, generating vibration abnormality alarm information for the vibration object, and using the vibration abnormality alarm information as the vibration object monitoring result.

12. The computer device of claim 11, wherein in a case where the vibration object is a pipeline, the computer program, when executed by the processor, implements generating the vibration abnormality alarm information for the vibration object in the following way:

identifying pipeline color information of the pipeline in the monitoring video picture, and acquiring region type information of the target monitoring region;

inquiring pipeline type information and pipeline working medium information corresponding to the pipeline according to the pipeline color information and the region type information; and generating alarm information comprising the pipeline type information, the pipeline working medium information and the vibration information, and using the alarm information as the vibration abnormality alarm information.

13. A non-transitory computer-readable storage medium, storing a computer program thereon, wherein the computer program, when executed by a processor, implements:

in response to detecting that a vibration object exists in a monitoring video picture for a target monitoring region, determining a vibration object region in the monitoring video picture, wherein the vibration object region is a region where the vibration object is located in the monitoring video picture; and wherein the monitoring video picture is divided into a plurality of candidate regions, a difference pixel value corresponding to each of the plurality of candidate regions is acquired, and a candidate region with a highest difference pixel value change degree is used as the vibration object region; and whether the vibration object exists in the monitoring video picture is determined according to an image content change degree in the monitoring video picture in the following way: N frames of images are selected from a monitoring video of the target monitoring region, a frame is extracted every n frames of the N frames of images as a sampled frame, an image difference between adjacent sampled frames is calculated, and in response to determining that a sum of image differences of N/n sampled images is within a set threshold interval, it is determined that the vibration object exists in the monitoring video picture;

recording displacement information of a key point of the vibration object in the vibration object region, wherein recording the displacement information of the key point of the vibration object in the vibration object region comprises: respectively calculating, in each image frame of the monitoring video picture, a distance between the key point of the vibration object and an original point in the vibration object region, and using the distance as a key point distance; and using the key point distance corresponding to each image frame as the displacement information;

determining vibration information of the vibration object in the monitoring video picture based on the displacement information; and generating a vibration object monitoring result for the target monitoring region according to the vibration information;

wherein in a case where the key point of the vibration object is a center point of the vibration object, the center point $C_t$ of the vibration object of each image frame is determined according to a set of edge points $L_t$ of the each image frame, wherein a coordinate calculation formulation of the center point $C_t$ is as follows:

$$C_t = (x_c, y_c) = \left( \frac{\Sigma_i^N x_i}{N}, \frac{\Sigma_i^N y_i}{N} \right)$$

wherein ($x_i$, $y_i$) denotes coordinates in the set of edge points $L_t$, and N denotes a total number of the edge points in the set of edge points $L_t$;

wherein a distance from the center point $C_t$ to the original point, i.e., a center point distance $D_t$, is determined, wherein a calculation formula of the center point distance $D_t$ is as follows:

$$D_t = \sqrt{x_c^2 + y_c^2}$$

wherein a normalization process is performed on the center point distance $D_t$ of each image frame, wherein a formula of the normalization process is as follows:

$$D_t = D_t - \text{mean}(D_t)$$

wherein t denotes a t-th image frame, $D_t$ denotes a center point distance of the t-th image frame, and mean($D_t$) denotes a mean of center point distances of all image frames; and wherein $D = \{D_1, D_2, \ldots, D_n\}$ obtained through the preceding processing is used as the displacement information.

14. The non-transitory computer-readable storage medium of claim 13, wherein the computer program, when executed by the processor, further implements:
   acquiring an image content change degree in the monitoring video picture; and
   in response to determining that the image content change degree is in a preset change range, determining that the vibration object exists in the monitoring video picture.

15. The non-transitory computer-readable storage medium of claim 13, wherein the computer program, when executed by the processor, implements determining the vibration object region in the monitoring video picture in the following way:
   dividing the monitoring video picture into a plurality of candidate regions;
   acquiring an image content change degree corresponding to each of the plurality of candidate regions in the monitoring video picture; and
   using a candidate region with a highest image content change degree as the vibration object region.

16. The non-transitory computer-readable storage medium of claim 13, wherein the computer program, when executed by the processor, implements determining the vibration information of the vibration object in the monitoring video picture based on the displacement information in the following way:
   plotting a vibration periodic signal for the vibration object according to the key point distance corresponding to each image frame; and
   determining a vibration amplitude of the vibration object and a vibration frequency of the vibration object according to the vibration periodic signal.

17. The non-transitory computer-readable storage medium of claim 13, wherein the vibration information comprises a vibration amplitude of the vibration object and a vibration frequency of the vibration object, and wherein the computer program, when executed by the processor, implements generating the vibration object monitoring result for the target monitoring region according to the vibration information in the following way:
   in response to determining at least one of the following: the vibration amplitude being greater than a preset amplitude threshold, or the vibration frequency being greater than a preset frequency threshold, generating vibration abnormality alarm information for the vibration object, and using the vibration abnormality alarm information as the vibration object monitoring result.

18. The non-transitory computer-readable storage medium of claim 17, wherein in a case where the vibration object is a pipeline, the computer program, when executed by the processor, implements generating the vibration abnormality alarm information for the vibration object in the following way:
   identifying pipeline color information of the pipeline in the monitoring video picture, and acquiring region type information of the target monitoring region;
   inquiring pipeline type information and pipeline working medium information corresponding to the pipeline according to the pipeline color information and the region type information; and
   generating alarm information comprising the pipeline type information, the pipeline working medium information and the vibration information, and using the alarm information as the vibration abnormality alarm information.

* * * * *